United States Patent Office 3,420,915
Patented Jan. 7, 1969

3,420,915
PHENOL MODIFIED HYDROCARBON RESINS AND BLENDS THEREOF WITH EPOXY RESIN, POLYURETHANE OR POLYTHIOL
Charles Henry Braithwaite, Jr., Los Angeles County, Calif., assignor to Cal-Colonial Chemsolve, La Habra, Calif., a corporation of California
No Drawing. Continuation-in-part of application Ser. No. 88,312, Feb. 10, 1961. This application Nov. 17, 1966, Ser. No. 594,990
U.S. Cl. 260—837        14 Claims
Int. Cl. C08g 33/10; C08g 45/06

ABSTRACT OF THE DISCLOSURE

A phenolic-hydrocarbon copolymer having a characteristic infra-red absorption curve containing from 1 to 60 percent of a phenol a substantial portion of which is in the diortho dialkylated form; and cured mixtures thereof with epoxy resins, isocyanates and polythiol resins.

---

This application is a continuation-in-part of application Ser. No. 88,312, filed Feb. 10, 1961, now abandoned.

This invention concerns copolymers of certain unsaturated hydrocarbons and phenolics, their preparation and use as modifiers with polymeric materials such as polyepoxides, polyurethanes, and polythiols.

The hydrocarbon-phenolic polymers of this invention are particularly suitable for use as modifiers of the aforementioned resins because of their miscibility with said resins at ambient temperatures and further, the capability of the resultant mixture to cure at ambient temperatures within a commercially acceptable period under appropriate catalytic conditions. Phenol-modified hydrocarbon resins have been described heretofore, e.g., Greenlee, United States Patent No. 3,069,373, however, said resins have a setting or softening point that is considerably higher than hydrocarbon-phenol copolymers of this invention having a comparable molecular weight. A high softening point is undesirable since either a solvent is required to miscibilize the phenol modified hydrocarbon and the epoxy resin, for example, and for many applications presence of a solvent is not permissible, or if a solventless system is used the phenol modified resin must be elevated to it softening point to render it miscible with the epoxy; the elevated temperatures acting to prematurely set the resin with the consequence of heterogeneous distribution of the resins and the resultant disadvantages of inadequately imparting hydrophobicity to the epoxy.

A significant distinction between the phenol-modified hydrocarbon resins of the prior art and the hydrocarbon-phenol copolymers of this invention is that the latter contains a substantial amount of dialkylated phenol in the polymeric chain, whereas, resins of others such as Greenlee prepared by reacting a hydrocarbon resin and a phenolic contain pendant hydroxyphenylated and/or phenolic ether groups and virtually little or no dialkylated phenol in the polymer chain. In this invention dialkylation of the phenol is achieved by reacting the phenolic and a hydrocarbon material which is essentially monomeric. It has been observed that the phenol-hydrocarbon copolymer of this invention has a substantially lower softening point than a phenol-modified hydrocarbon resin prepared by modifying a hydrocarbon resin with a phenolic, even though both materials contain substantially similar amounts of added phenol.

The resins of this invention are phenolic modified hydrocarbon resins. Illustrative phenolic constituents are phenol, o-cresol, m-cresol, p-cresol, mp-cresol, 2,3-xylenol, 2,4-xylenol, 2,5-xylenol, 2,6-xylenol, 3,5-xylenol, o-ethyl phenol, methyl phenol, p-ethyl phenol, o-n-propyl phenol, m-n-propyl phenol, p-n-propyl phenol, o-n-butyl phenol, m-isobutyl phenol, p-isobutyl phenol, o-tert-butyl phenol, m-tert-butyl phenol, p-tert-butyl phenol, o-sec-butyl phenol, m-n-butyl phenol, p-n-butyl phenol, o-isobutyl phenol, m-sec-butyl phenol, p-sec-butyl phenol, octyl phenols, nonyl phenols, decyl phenols, dodecyl phenols, 3-ethyl-5-methyl phenol and other mono- and polyalkyl substituted higher molecular weight phenols.

In addition to the individual phenols, mixtures of them, such as cresylic acids, can be used in my invention. The mixtures can be natural cresylic acids, or may be blended from selected distillation fractions of cresylic acids or may be mixtures of synthetic compounds. The cresylic acids can be derived from petroleum, coal tar or synthetic origin.

The phenolic constitutent may be present in concentrations from 1% to 60% of the total resin, though it is particularly desirable to have at least 10% by weight of phenolic material and preferably at least 35%.

The monomeric hydrocarbon material should contain a substantial proportion of diolefin relative to the monoolefin. It has been observed that hydrocarbons having on the order of at least 10% by volume diolefinic material produce a copolymer that is miscible with epoxy resins at ambient temperatures. Two sources of suitable hydrocarbon material are petroleum hydrocarbons known as Dripolene (an accepted name for the byproduct of cracking light hydrocarbons to ethylene) and Steam Cracked Distillate. Some typical compositions of these mixtures of hydrocarbons are shown in the following Table I.

TABLE I.—COMPOSITION OF RAW MATERIALS STREAMS FOR PETROLEUM RESINS MANUFACTURE

Dripolene,[1] percent by volume:

| | |
|---|---|
| $C_3$'s | 0.7 |
| $C_4$ olefins | 1.4 |
| $C_4$ diolefins | 3.9 |
| $C_4$ saturates | 0.5 |
| $C_5$ diolefins | 7.7 |
| $C_5$ olefins | 6.5 |
| Other $C_5$'s | 6.4 |
| Benzene | 34.2 |
| Toluene | 7.8 |
| Xylenes | 1.0 |
| Styrene | 3.0 |
| Dicyclopentadiene | 5.0 |
| Boiling range, degrees fahrenheit | 110–360 |
| Bromine number | 104 |
| Maleic anhydride value | 79 |

Steam cracked distillate[2] (after debutanizing), percent by volume:

| | |
|---|---|
| $C_5$ cyclic diolefins | 5 |
| $C_5$ aliphatic diolefins | 5 |
| $C_5$ olefins | 20–21 |
| $C_6$–$C_8$ diolefins | 8–10 |
| $C_6$–$C_8$ olefins | 14–15 |
| $C_9$–$C_{12}$ diolefins | 3 |
| $C_9$–$C_{12}$ olefins | 4 |
| Benzene | 15 |
| Toluene | 10 |
| Xylene and higher aromatics | 10–12 |

[1] From Gordon and Wadsworth, U.S. Patent No. 2,798,866, July 9, 1959.
[2] From Aldridge and Small, U.S. Patent No. 2,824,860, Feb. 25, 1958.

The compatibility with epoxy resins increases with the increase in phenolic content. A hydrocarbon resin derived from a petroleum source, modified with 40% of a phenolic constitutent, was found to be compatible with an uncured commercial epoxy resin having an epoxy value of about 0.5 when employed in the range of 0.1 to over 99% of the hydrocarbon resin at room temperature. Moreover, clear castings, free of indication of incompatibility, are formed if the epoxy resins modified with the phenol-hydrocarbon resins of this invention are cured with typical amine or anhydride catalysts and crosslinking agents.

The following examples illustrate the preparation of the phenolic-hydrocarbon copolymers of this invention:

EXAMPLE I

A mixture was prepared consisting of 223 gms. of Dripolene and 60 g. of o-cresol. The cresol-Dripolene mixture was added to a 500 ml. reaction flask. A catalyst consisting of 6.5 gms. of $BF_3$ in o-cresol ($BF_3$ content, 23.2% by weight) was added to the reaction vessel dropwise. The exothermic reaction was controlled to 60° C. by cooling externally, and by controlling the rate of addition of the $BF_3$-o-cresol complex. After the addition of catalyst was complete, the temperature of the reaction was maintained at 60° C. for an additional 60 minutes. The reaction vessel was then fitted with a condenser, and the aromatics solvents, obtained from the Dripolene, were removed under a vacuum of 100 mm. by steam distillation. The softening point of the isolated resin (ball and ring method) was 10° C.; the total yield of resin (40% phenol) was 137 g.

EXAMPLE II

A resin containing 48% cresol was prepared from steam cracked naphtha. A 40 g. portion of o-cresol was added to the Steam Cracked Distillate, and 5 g. of the $BF_3$-o-cresol catalyst of Example I were added portionwise. The reaction was controlled and completed following the conditions set forth in Example I and the solvent was removed also as set forth in the above example. A total of 100 g. of resin was recovered. The resin was liquid at room temperature.

Hydrocarbon resins prepared from coal tar olefins and from polyterpenes can also be modified as outlined in Example I.

Although the catalyst used in the above example was $BF_3$, my invention is not limited to this catalyst. Any substance capable of polymerizing olefins and simultaneously causing alkylation of the aromatic phenols can be used. Other typical catalysts are sulfuric acid, hydrofluoric acid and aluminum chloride.

EXAMPLE III

Using the method outlined in Example I, with Dripolene as the hydrocarbon raw material, a series of resins were prepared with various phenolic compounds. Both relatively pure phenolic materials and broad range cresylic acids were used in this series of preparations. The results are summarized in the following Table II.

TABLE II.—PREPARATION OF PHENOLIC-HYDROCARBON RESINS WITH VARIOUS PHENOLS

| Resin | Phenol | Weight Percent of Phenol in Resin | Hydrocarbon Raw Material | Softening point of Resin |
|---|---|---|---|---|
| A | Phenol | 52 | Dripolene | 35° C. |
| B | mp-Cresol [a] | 52 | ----do---- | 20° C. |
| C | Xylenols [b] | 52 | ----do---- | 20° C. |
| D | Phenol | 52 | Steam cracked distillate. | Liquid at room temp. |
| E | mp-Cresol [a] | 52 | ----do---- | Do. |

[a] 50% minimum meta cresol grade mp-cresol.
[b] Contains 2,4-xylenol, 2,5-xylenol, 3,5-xylenol, and 3,4-xylenol; 3,5-xylenol content about 25%.

The compatibility of the phenolic-hydrocarbon resins with epoxy resins is shown in Table III. The compatibility of an o-cresol-Dripolene resin containing 45% o-cresol with a bisphenol A epichlorohydrin type polyepoxide having an epoxy equivalent of 0.5 at various concentrations of epoxy component is shown in Table III.

TABLE III

| Constituents | Extended Epoxy Resins | | | | | | |
|---|---|---|---|---|---|---|---|
| | F | G | H | I | J | K | L |
| | Weight of Constituents (mg.) | | | | | | |
| Cresol-hydrocarbon Resin | 7.1 | 5.9 | 7.0 | 6.4 | 9.4 | 10.9 | 12.7 |
| Epoxide | 12.4 | 5.4 | 5.8 | 2.9 | 3.0 | 2.5 | 1.2 |
| Triethylene tetramine (Catalyst) | 1.1 | 0.65 | 0.7 | 0.4 | 0.7 | 1.1 | 0.5 |
| Hardness (Shore D), 24 hrs. room temperature cure | 75–80 | 50–70 | 70–80 | | 40 | 25–30 | <25 |
| Compatibility | All Compatible | | | | | | |
| Water Absorption, 31 days room temperature (percent) | 1.2 | | 1.7 | | 0.6 | | |

Table IV shows various castings made from the epoxide resin referred to in Table III with varying concentrations of phenolic-hydrocarbon resin, which resin in turn has varying concentrations of phenolic material. All castings were clear and had no indications of incompatibility between epoxy resin and phenolic-hydrocarbon resin.

TABLE IV.—CASTINGS OF RESINS PREPARED FROM EPOXY RESIN AND PHENOLIC-HYDROCARBON RESINS MODIFIED WITH VARYING AMOUNTS OF o-CRESOL

| Components of Casting Resins | Designation of Casting | | | | | | | |
|---|---|---|---|---|---|---|---|---|
| | M | N | O | P | Q | R | S | T |
| Percent o-cresol in Petroleum Resin | 24 | 24 | 24 | 37 | 42.5 | 42.5 | 42.5 | 45.0 |
| Parts Petroleum Resin | 7.2 | 13.7 | 9.9 | 4.8 | 6.8 | 11.0 | 14.2 | 7.0 |
| Parts Epoxy Resin | 2.9 | 3.7 | 1.1 | 3.7 | 5.2 | 3.8 | 1.9 | 5.8 |
| Parts Catalyst | 0.4 | [a] 1.0 | [a] 1.0 | [b] 0.45 | [b] 3.2 | [a] 0.5 | [a] 0.23 | 0.7 |

[a] Triethylene tetramine.
[b] Phthalic anhydride.

The effect of the source of raw material on compatibility with epoxy resins is shown in Table V.

TABLE V.—CASTING RESINS PREPARED FROM ARALITE 6010 WITH MODIFIED PETROLEUM RESINS

| Casting | U | V | W | X | Y |
|---|---|---|---|---|---|
| Raw Material Source | Dripolene | Dripolene | Dripolene | SCD [a] | SCD [a] |
| Percent Phenol in Resin | 52 | 52 | 52 | 52 | 52 |
| Phenolic Compound Used | Phenol | mp-Cresol | Xylenols | Phenol | mp-Cresol |
| Percent Aralite 6010 | 37 | 30 | 32 | 47 | 45 |
| Catalyst (phr.) [b] | 14 | 17 | 15 | 9 | 8.5 |
| Results | All Compatible | | | | |

[a] Steam Cracked Distillate.
[b] Triethylene tetramine; phr. is with reference to epoxy resin only.

Properties of the phenolic-hydrocarbon resin-epoxy resin compositions are compared with typical commercial hydrocarbon resins admixed with epoxy resins in Table VI.

TABLE VI

| Resin | Parts | Epoxy Resin | Parts | Catalyst TETA[b] (Parts) | Results |
|---|---|---|---|---|---|
| Modified Petroleum Resin[a] | 3.3 | Ciba 6010 | 11.2 | 1.5 | Border line compatibility. |
| Do.[a] | 7.7 | Ciba 6010 | 9.8 | 1.5 | Incompatible. |
| 10.5% o-Cresol in Dripolene | 3.7 | Ciba 6010 | 10.5 | 1.8 | Cloudy. |
| Do | 1.6 | Ciba 6010 | 14.8 | 1.6 | Compatible. |
| Do | 9.8 | Ciba 6010 | 11.0 | 1.3 | Called cloudy. |
| Dripolene Resins Without Modification. | 2.0 | Ciba 6010 | 10.0 | 1.3 | Incompatible. |

[a] The modified petroleum resin herein is a modified petroleum resin recommended for rubber additive uses.
[b] TETA is tri-ethylene tetramine.

The improvement in compatibility of phenolic modified hydrocarbon resins and epoxy resins derived from soya bean oil, polybutadiene, and unsaturated cyclohexane rings is shown in Table VII.

TABLE VII.—EXTENSION OF VARIOUS EPOXY RESINS WITH PHENOLIC MODIFIED HYDROCARBON RESINS

| Resin Mixture | Epoxy Resin | Parts of Epoxy Resin | Dripolene Phenolic Resin | Parts of Phenolic Resin | Epoxy Curing Agent,[4] Parts | Result |
|---|---|---|---|---|---|---|
| AA | (1) | 2.0 | 37% o-cresol | 14.3 | None | Compatible. |
| AB | (1) | 2.6 | do | 13.3 | None | Do. |
| AC | (1) | 2.1 | do | 18.8 | None | Do. |
| AD | (1) | 2.2 | 24% o-cresol | 12.0 | None | Do. |
| AE | (1) | 4.0 | 50% phenol | 11.0 | 5.9 | Compatible before and after cure. |
| AF | (1) | 4.9 | 37% o-cresol | 1.0 | 3.0 | Compatible. |
| BA | (2) | 1.1 | 42.5% o-cresol | 11.6 | None | Do. |
| BB | (2) | 6.0 | 24% o-cresol | 2.1 | None | Incompatible. |
| BC | (2) | 6.5 | 50% phenol | 3.8 | 4.7 | Compatible. |
| CA | (3) | 3.6 | do | 5.9 | 7.1 | Do. |
| CB | (3) | 5.4 | 24% o-cresol | 2.9 | None | Incompatible. |
| CC | (3) | 6.2 | 37% o-cresol | 2.0 | 3.5 | Compatible. |

[1] A product identified as a dicyclodiepoxy craboxylate.
[2] Epoxidized polybutadiene.
[3] Epoxidized soya bean oil.
[4] Methyl nadic anhydride.

The phenolic-hydrocarbon resins of this invention have infra-red absorption peaks at 2.95, 3.4, 6.7, 6.9, 8.1, 12.1, 13.3 and 14.3 microns. A resin prepared according to Example I but having 50% added phenol gave the following IR data for a film of the resin cast from a chloroform solution on a sodium chloride plate:

| Wavelength (microns): | Absorbance |
|---|---|
| 2.95 | 0.252 |
| 6.28 | 0.345 |
| 6.68 | 0.166 |
| 6.75 | 0.345 |
| 6.9 | 0.592 |
| 7.95 | 0.320 |
| 8.1 | 0.722 |
| 8.28 | |
| 8.55 | 0.310 |
| 8.9 | 0.042 |
| 9.15 | 0.055 |
| 9.4 | 0.12 |
| 10.1 | 0.12 |
| 10.3 | 0.11 |
| 10.6 | 0.10 |
| 12.1 | 0.212 |
| 12.6 | 0.086 |
| 13.3 | 0.574 |
| 14.3 | 0.459 |

The absorption at 14.3 microns is characteristic of the diorthodialkylation of the phenolic molecule. By preparing the phenolic-hydrocarbon by the reaction of monomeric phenolic and hydrocarbon materials a substantial portion of the phenolic molecule enters the molecular chain via dialkylation at the ortho positions. For the sample referred to above, the absorptivity data shown above suggest that as much as one-third of the added phenol becomes ortho-dialkylated. The formation of ortho-dialkylated phenol in the molecular chain acts to substantially lower the softening point of the resin as compared to phenol-modified hydrocarbon resins of a comparable molecular weight and phenolic concentration.

The phenolic-hydrocarbon resins of this invention can be added in any amount up to 80% by weight of the epoxy resin to produce a thermosetting resin. Above 80% the resulting product has been found to be thermoplastic. Preferably, the phenolic-hydrocarbon resin should be present in an amount from 35 to 75%.

The phenolic-hydrocarbon resins of this invention are also compatible and reactive with isocyanates, forming stable solutions at room temperatures and reacting at higher temperatures. The phenolic-hydrocarbon resin can be used to modify the reaction products of polyisocyanates with hydroxy containing polyols, polyesters and polyethers. The resulting polyurethane (reaction between isocyanate group and phenolic hydroxy group) is also compatible with the phenolic-hydrocarbon resin. Examples IV–IX illustrate the use of the phenolic-hydrocarbon resins of this invention and polyisocyanates.

EXAMPLE IV

A portion 65% 2,4 tolylene diisocyanate-35% 2,6 tolylene diisocyanate was mixed with 42.5% o-cresol Dripolene resin. The diisocyanate modified petroleum resin changed after 6 days aging from a tacky semi-solid to a tack free thermoplastic solid. Six days aging of the base modified Dripolene resin produced no change in physical properties.

EXAMPLE V

A Dripolene resin containing 45% o-cresol as a modification agent was found to be miscible in all proportions with tolylene diisocyanate. When triethylene tetraamine was used as a catalyst to cure a 40% isocyanate-60% petroleum resin mixture, a film of the resulting product, air dried for 24 hours under ambient conditions, was found to have excellent resistance to both 5% and 20% caustic in a 24 hour test.

EXAMPLE VI

Solutions of 40% phenol-Dripolene resin, tolylene diisocyanate and polyols were prepared:

| Component (Parts) | Formulation | | |
|---|---|---|---|
| | A | B | C |
| 40% phenol-Dripolene Resin | 50 | 50 | 50 |
| Tolylene Diisocyanate (TDI) | 35 | 35 | 17.5 |
| Polypropyl glycol hydroxyl No. 109 | 28 | 56 | 0 |

All above solutions were stable in closed containers for 3 to 9 days. No gel formation was noted.

EXAMPLE VII

| Formulation | D | E |
|---|---|---|
| Resin | 30 parts C | 30 parts A. |
| Water | 0.5 parts | 0.5 parts. |
| Catalyst | DMP-30 | Stannous octoate. |
| Bubble Control Agent | Silicone | Silicone. |

Formulation D foamed and gelled. It had a foam density of 3.5 lbs./cu. ft.

Formulation E foamed, cured to a foamed flexible resin.

EXAMPLE VIII

The following were mixed: 10 g. TDI, 10 g. 40% phenol-Dripolene resin, 10 g. polyethylene glycol (hydroxyl No. 55), and 5 g. each of $TiO_2$ and talc. 1 g. of stannous octoate was added. The resultant mixture was used on a wood panel and an asphalt tile. After 6 hours it had cured to a soft tack free film at ambient conditions.

EXAMPLE IX 50 g. of 40% phenol-Dripolene resin, 35 g. of TDI, and 35 g. of polyoxypropylene triol (hydroxyl No. 160) were mixed (Mixture A). 10 g. of Mixture A were mixed with 0.3 g. of stannous octoate and the mixture foamed due to reaction with moisture in the ambient air.

Mixture A aged 4 days, as a 70% solids mixture in toluene, was used to a coat plywood and both wet and dry concrete. The adhesion to plywood, dry concrete, wet concrete, and to itself, was excellent.

The phenolic-hydrocarbon resins can also be further condensed with formaldehyde, or trimethylol phenol to form thermosetting resins. This is shown in Examples X and XI.

EXAMPLE X

A resin prepared by the $BF_3$ catalyzed reaction of Dripolene and o-cresol was used to demonstrate the reactivity of the resin in phenol-formaldehyde reactions. The added o-cresol amounted to 42.5% of the final resin. To this resin was added qualitatively a few drops of trimethylolphenol. The resulting mixture, which was not entirely compatible initially because of water contained in the methylol phenol, was spread on paper. A two sheet laminate was made and cured on a hot plate. The laminate was subsequently boiled in water for 5 minutes without delamination. Further, two small pieces of wood veneer were bonded with the o-cresol modified petroleum resin-trimethylolphenol mixture and cured on a hot plate. The wood laminate was boiled in water for 15 minutes without delamination.

EXAMPLE XI

A mixture of 111 g. of phenol and 455.2 g. of Dripolene were charged to a 1 liter flask. A total of 17.0 g. of a 20% $BF_3$ solution in phenol were added dropwise to the reaction vessel. The exothermic reaction was controlled to 70° C. by external cooling for two hours. The reaction mixture was washed with 20% caustic and then with water. The organic portion was charged to a 1 liter flask and steam distilled to remove the unreacted hydrocarbons. The weight of resin obtained, as a viscous oil, was 227 g.

EXAMPLE XII

A mixture of 16 g. of 40% formaldehyde, 22 g. of the product of Example XI and 2 g. of NaOH gave a resin emulsion on mixing. The emulsion, spread on steel as a coating, dried overnight to a tack free film indicating that resin was cured with the formaldehyde.

The following examples illustrate the compatibility and reactivity of the phenolic-hydrocarbon resins with alkyl polysulfide polymers and with thiol terminated polyethers.

EXAMPLE XIII

A 30% phenol-steam cracked distillate resin was used. Mixtures of this resin and a liquid alkyl polysulfide having a molecular weight of about 4000 (Thiokol LP-32) were prepared as follows:

| Parts Phenolic Hydrocarbon Resin | Parts LP-32 | Parts Catalyst* |
|---|---|---|
| 0 | 60 | 8.7 |
| 6 | 54 | 7.8 |
| 12 | 48 | 7.0 |
| 18 | 42 | 6.1 |
| 24 | 36 | 5.2 |
| 30 | 30 | 4.4 |

*A stearic acid modified lead dioxide mixture recommended for cure of LP-32 resin at the ratio of 14 parts per hundred of resin.

The five samples were each mixed in 8 oz. paper cups, and from the mixed materials two specimens were cast in 2″ diameter aluminum pans; the pans were filled to the depth of ½″. All specimens were cured to a rubbery state within 24 to 40 hours.

A sample of the cured 30% LP-32 material was immersed in an aromatic solvent. After over 24 hours, the sample was removed, and the solvent allowed to dissipate at ambient conditions. Infra-red spectral comparison of the specimen before and after immersion showed that no petroleum resin had been extracted. A second specimen was immersed in pentane. After 24 hours in pentane, the specimen appeared to be unchanged; moreover, the pentane showed no evidence of petroleum resin in its spectrum after the immersion.

Both the above observations on solvent action on the LP-32 petroleum resin mixtures indicate that the phenolic-hydrocarbon resin had reacted with the polysulfide resin and could not be separated from it after the reaction.

EXAMPLE XIV

The ability of the 40% phenol-Dripolene resin to modify thiol-terminated polyether resins is illustrated as follows:

| Mixture Number | A | | B | | C | |
|---|---|---|---|---|---|---|
| | I | II | I | II | I | II |
| $PbO_2$ | 10 | | 10 | | 10 | |
| MTPR [1] | | 100 | | 100 | | 100 |
| Phenol-Dripolene Resin | 73 | | 100 | | 85 | |
| Ground $CaCO_3$ | 150 | 150 | 150 | 150 | 150 | 150 |
| Diacetone Alcohol | 10 | 15 | 25 | | 40 | 10 |
| Cellusolve Acetate | 25 | | | | 25 | |
| Stearic Acid | | | | | 1 | |

[1] A thiol terminated polyether resin.

In each of products A, B, and C, Mixtures I and II were added and allowed to stand. After 20 hours all the above formulations had cured.

EXAMPLE XV

A mixture of 60 g. of a 40% phenol Dripolene resin and 20 g. of a thiol terminated polyether resin were prepared. To 10 g. of the above mixture were added 1.0 g. of emulsifying agents and 90 g. of water. The mixture was agitated to form an emulsion, and the resulting emulsion was used to saturate a 4″ deep 5″ diameter sand bed. After 24 hours, the sand was cemented together by the cured resin.

A mixture of 80 g. of a thiol terminated polyether resin and 720 g. of a 40% phenol hydrocarbon resin were used to generate an emulsified material. To 200 g. of the above mixture were added 12 g. of emulsifying agent. After 21 days, the polyether and phenol-hydrocarbon resins had separated from the emulsion and polymerized to the extent that they could no longer be dispersed.

I claim:

1. A phenolic hydrocarbon copolymer having infra-red absorption peaks at 2.95, 3.4, 6.7, 6.9, 8.1, 12.1, 13.3 and 14.3 microns, wherein the phenolic material is present in from 10-60% by weight of the copolymer and wherein a substantial portion of the phenolic material is present in the molecular chain in the diortho dialkylated form.

2. The copolymer of claim 1, wherein the phenolic material is present in from 35-60% by weight of the copolymer.

3. The copolymer of claim 2, wherein the phenolic material is phenol.

4. The copolymer of claim 2, wherein the phenolic material is o-cresol.

5. The copolymer of claim 1, wherein the hydrocarbon is dripolene.

6. The copolymer of claim 1, wherein the hydrocarbon is cracked steam distillate.

7. The copolymer of claim 2, wherein the hydro-carbon is dripolene.

8. The copolymer of claim 2, wherein the hydrocarbon is cracked steam distillate.

9. An epoxy resin and phenolic-hydrocarbon copolymer reaction product comprising the reaction product of an epoxy resin and a phenolic-hydrocarbon copolymer having infra-red absorption peaks at 2.95, 3.4, 6.7, 6.9, 8.1, 12.1, 13.3 and 14.3 microns, wherein the phenolic material is present in from 10–60% by weight of the copolymer and wherein a substantial portion of the phenolic material is present in the molecular chain in diortho dialkylated form.

10. The reaction product of claim 9, wherein the phenolic material is present in the phenolic-hydrocarbon copolymer in an amount of 35–50% by weight of the copolymer and the phenolic-hydrocarbon copolymer is present in an amount of 50–75% of the reaction product.

11. An isocyanate modified phenolic-hydrocarbon copolymer the reaction product of an isocyanate selected from the group consisting of diisocyanates and mixtures thereof with a hydroxy-containing polyol, polyester or polyether and a phenolic-hydrocarbon copolymer having infra-red absorption peaks at 2.95, 3.4, 6.7, 6.9, 8.1, 12.1, 13.3 and 14.3 microns, wherein the phenolic material is present in from 10–60% by weight of the copolymer and wherein a substantial portion of the phenolic material is present in the molecular chain in diortho dialkylated form.

12. The reaction product of claim 11, wherein the phenolic material is present in the phenolic-hydrocarbon copolymer in an amount of 35–50% by weight of the copolymer and the phenolic-hydrocarbon copolymer is present in an amount of 35–50% of the reaction product.

13. A polythiol resin and phenolic-hydrocarbon copolymer reaction product comprising the reaction product of a polythiol resin and a phenolic-hydrocarbon copolymer having infra-red absorption peaks at 2.95, 3.4, 6.7, 6.9, 8.1, 12.1, 13.3 and 14.3 microns, wherein the phenolic material is present in from 10–60% by weight of the copolymer and wherein a substantial portion of the phenolic material is present in the molecular chain in diortho dialkylated form.

14. The reaction product of claim 13, wherein the phenolic material is present in the phenolic-hydrocarbon copolymer in an amount of 35–50% by weight of the copolymer and the phenolic-hydrocarbon copolymer is present in an amount of 20–50% of the reaction product.

References Cited

UNITED STATES PATENTS

| | | | |
|---|---|---|---|
| 2,798,867 | 7/1957 | Gordon et al. | 260—82 |
| 2,824,860 | 2/1958 | Aldridge et al. | 260—82 |
| 3,032,533 | 5/1962 | Patterson et al. | 260—47 |
| 3,069,373 | 12/1962 | Greenlee | 260—28 |
| 3,110,699 | 11/1963 | Schmitz-Josten | 260—62 |
| 3,177,166 | 4/1965 | Gregory | 260—5 |
| 3,258,450 | 6/1966 | Aronoff et al. | 260—62 |

OTHER REFERENCES

Payne, "Organic Coating Technology," vol. I, 1954, p. 185.

DONALD E. CZAJA, *Primary Examiner.*

R. A. WHITE, *Assistant Examiner.*

U.S. Cl. X.R.

260—859, 874, 62